United States Patent [19]
Brown et al.

[11] Patent Number: 5,181,140
[45] Date of Patent: Jan. 19, 1993

[54] BINOCULAR SHIELD

[76] Inventors: Johnny L. Brown; Donna D. Brown, both of Rte. #2, Box 507-B, Robbins, N.C. 27325

[21] Appl. No.: 675,851

[22] Filed: Mar. 27, 1991

[51] Int. Cl.⁵ .................... G02B 11/04; G02B 21/00
[52] U.S. Cl. .................... 359/507; 359/513; 359/600; 33/244
[58] Field of Search .................. 359/407–435, 359/462–482, 600–612, 507–514, 896

[56] References Cited

U.S. PATENT DOCUMENTS

| 1,290,279 | 1/1919 | Mihalyl | 359/ |
| 1,808,642 | 6/1931 | Duffy | 359/600 |
| 1,965,755 | 7/1934 | Warmisham | 359/600 |
| 4,089,117 | 5/1978 | Villarreal | 359/611 |
| 4,384,767 | 5/1983 | Kawai | 359/611 |
| 4,610,517 | 9/1986 | Fukino | 359/611 |
| 4,909,617 | 3/1990 | Boyd | 359/511 |

FOREIGN PATENT DOCUMENTS

| 863600 | 1/1953 | Denmark | 359/513 |
| 42403 | 3/1924 | Fed. Rep. of Germany | 359/513 |

Primary Examiner—Bruce Y. Arnold
Assistant Examiner—Thong Nguyen
Attorney, Agent, or Firm—Leon Gilden

[57] ABSTRACT

A device for securement to forward terminal end portions of a binocular organization, including an elastomeric band mounted to each binocluar end portion, with each band mounting a hood member whose exterior convex surface is coextensive with the band, wherein the hood is formed of a flexible material to provide shield and shading to the forward lens portions of the binocular organization.

1 Claim, 4 Drawing Sheets

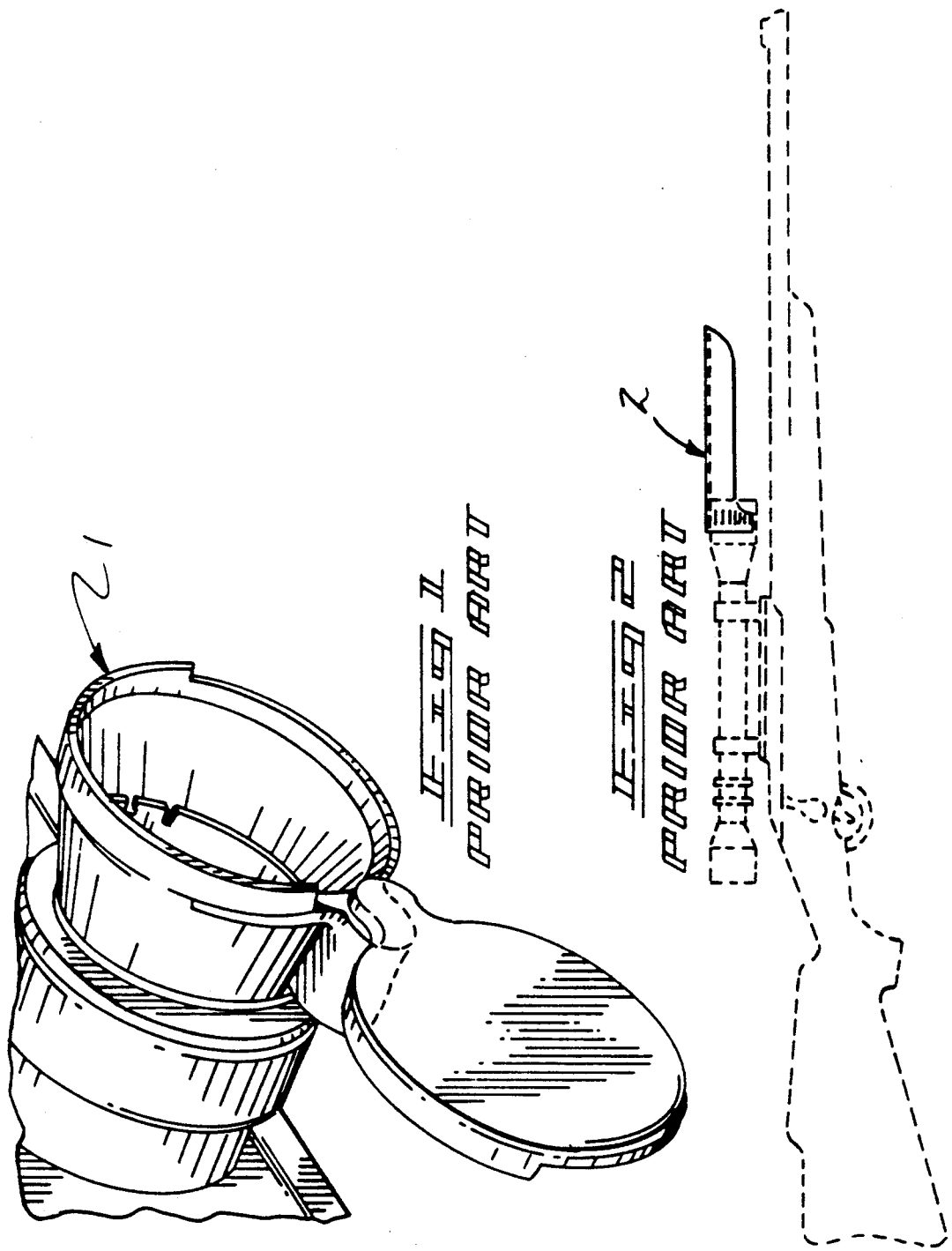

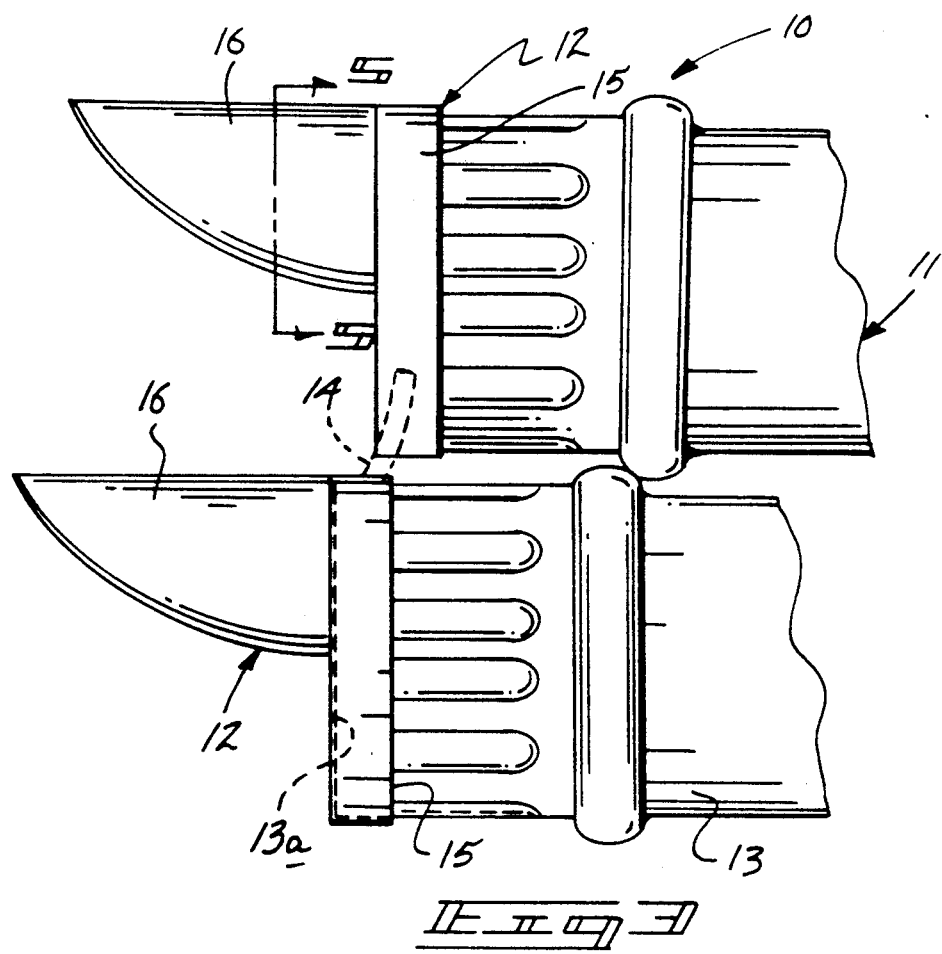
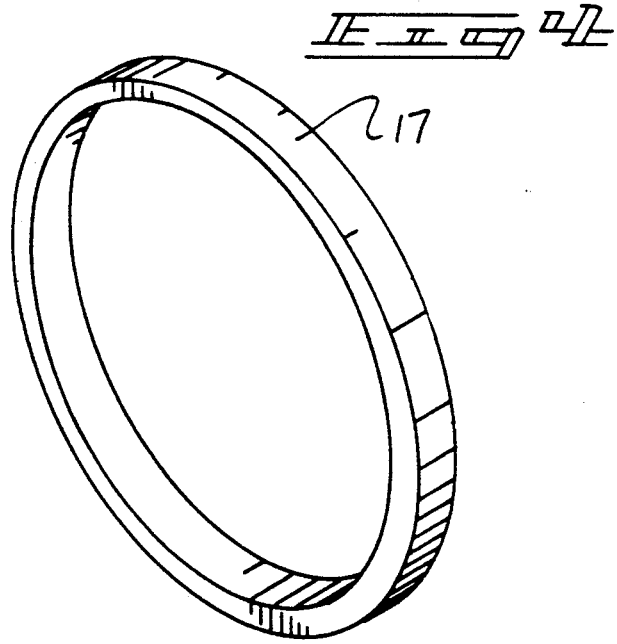

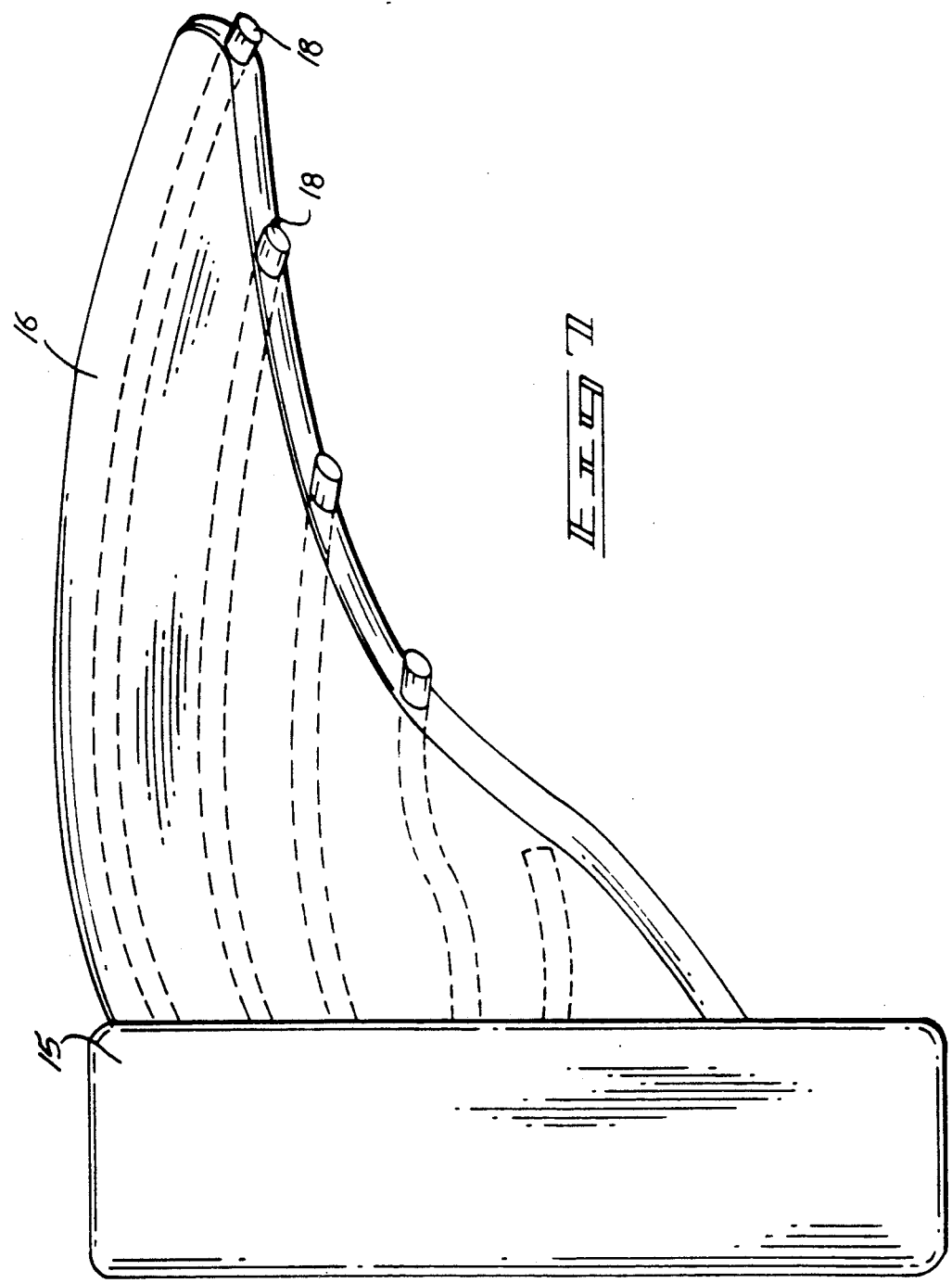

BINOCULAR SHIELD

BACKGROUND OF THE INVENTION

1. Field of the Invention

The field of invention relates to binoculars and equipments therefore, and more particularly pertains to a new and improved binocular shield wherein the same is arranged for attachment to forward end portions of a binocular for providing shade and protection to lens structure of the binoculars.

2. Description of the Prior Art

Shielding equipment for use in affording protection to lens structure to binocular or camera type organizations is utilized in the prior art. Such devices for example may be found in U.S. Pat. No. 4,909,617 to Boyd sets forth a camera hood structure utilizing a rigid pivotal cap for affording protection to the camera lens.

U.S. Pat. No. 4,089,117 to Villarreal sets forth a sunshade structure that is secured to a forward terminal end of a telescope formed as a split band member formed with a forwardly directed shade.

U.S. Pat. No. 4,384,767 to Kawai sets forth a hood structure for use in a camera and the like that is clamped to the camera lens.

Similarly U.S. Pat. No. 4,610,517 to Fukino, et al. sets forth a similar type lens hood for clamping to a camera lens housing.

As such, it may be appreciated that there continues to be a need for a new and improved binocular shield as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of shield devices now present in the prior art, the present invention provides a binocular shield wherein the same is arranged for affording protection and shading to binocular structure. As such, the general purpose of the present invention, which will be described subsequently in greater detail, is to provide a new and improved binocular shield which has all the advantages of the prior art binocular shields and none of the disadvantages.

To attain this, the present invention provides a device for securement to forward terminal end portions of a binocular organization, including an elastomeric band mounted to each binocular end portion, with each band mounting a hood member whose exterior convex surface is coextensive with the band, wherein the hood is formed of a flexible material to provide shield and shading to the forward lens portions of the binocular organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved binocular shield which has all the advantages of the prior art binocular shields and none of the disadvantages.

It is another object of the present invention to provide a new and improved binocular shield which may be easily and efficiently manufactured and marketed.

It is a further object of the present invention to provide a new and improved binocular shield which is of a durable and reliable construction.

An even further object of the present invention is to provide a new and improved binocular shield which is susceptible of a low cost of manufacture with regard to both materials and labor, and which accordingly is then susceptible of low prices of sale to the consuming public, thereby making such binocular shield economically available to the buying public.

Still yet another object of the present invention is to provide a new and improved binocular shield which provides in the apparatuses and methods of the prior art some of the advantages thereof, while simultaneously overcoming some of the disadvantages normally associated therewith.

Still another object of the present invention is to provide a new and improved binocular shield wherein the same is arranged for securement to a forward terminal end of each leg of a binocular adjacent a forward terminal end of each leg for affording protection to the associated lens.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art shield structure;

FIG. 2 is an orthographic side view of a prior art shield structure for mounting to a telescope structure;

FIG. 3 is an orthographic side view of the instant invention mounted to the leg portions of a binocular organization;

FIG. 4 is an isometric illustration of an optional band member utilized by the instant invention;

FIG. 7 is an orthographic side view of the instant invention in a contoured configuration.

DESCRIPTION OF THE PREFERRED EMBODIMENT

Figure 5:
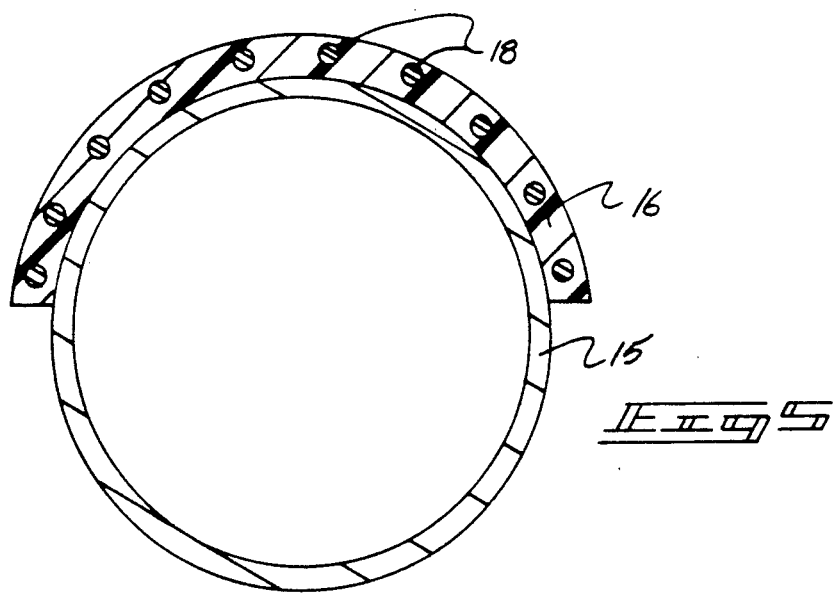
FIG. 5 is an orthographic end view, taken along the lines 5—5 of FIG. 3 in the direction indicated by the arrows.

With reference now to the drawings, and in particular to FIGS. 1 to 7 thereof, a new and improved binocular shield embodying the principles and concepts of the present invention and generally designated by the reference numeral 10 will be described.

FIG. 1 illustrates a prior art, camera lens shield structure, as set forth in U.S. Pat. No. 4,909,617, wherein the structure 1 is arranged for securement to a forward end portion of a camera lens, with a pivotal cap for affording protection to the lens during non-use of the camera. FIG. 2 illustrates a further prior art shade structure 2, as set forth in U.S. Pat. No. 4,089,117, wherein the shade structure sets forth an elongate hood for affording shade protection to the forward lens of the telescope member.

More specifically, the binocular shield apparatus 10 of the instant invention essentially comprises a binocular assembly 11 that includes a plurality of binocular legs 13 for binocular lenses of conventional construction defined by a forward terminal end 13a. A plurality of shield members 12 are mounted onto each binocular leg 13 secured about each terminal end 13a, with each shield member 12 defined by a resilient cylindrical band 15 formed with an integral hood member 16. The hood member 16 is defined by a convex exterior surface whose rear terminal edge is mounted to the band 15 coextensively with an exterior surface of the band 15 and with a rear convex edge defining an arc between one hundred forty and two hundred seventy degrees. Optionally, one hundred eighty degrees of arc defines an inner face between the rear edge of the shade 16 and a side edge of the cylindrical band 15. The hood member 16 is of a flexible construction, as illustrated, to provide shade and protection to a lens of the binocular assembly 11. A joinder strap 14 may be utilized and mounted to adjacent portions of the adjacent cylindrical bands 15 to secure the bands in a single assembly. Further, a further band 17 may be provided (see FIG. 4) and stretched for securement about the adjacent cylindrical bands 15 to enhance securement of the bands to the binocular structure.

Figure 6:
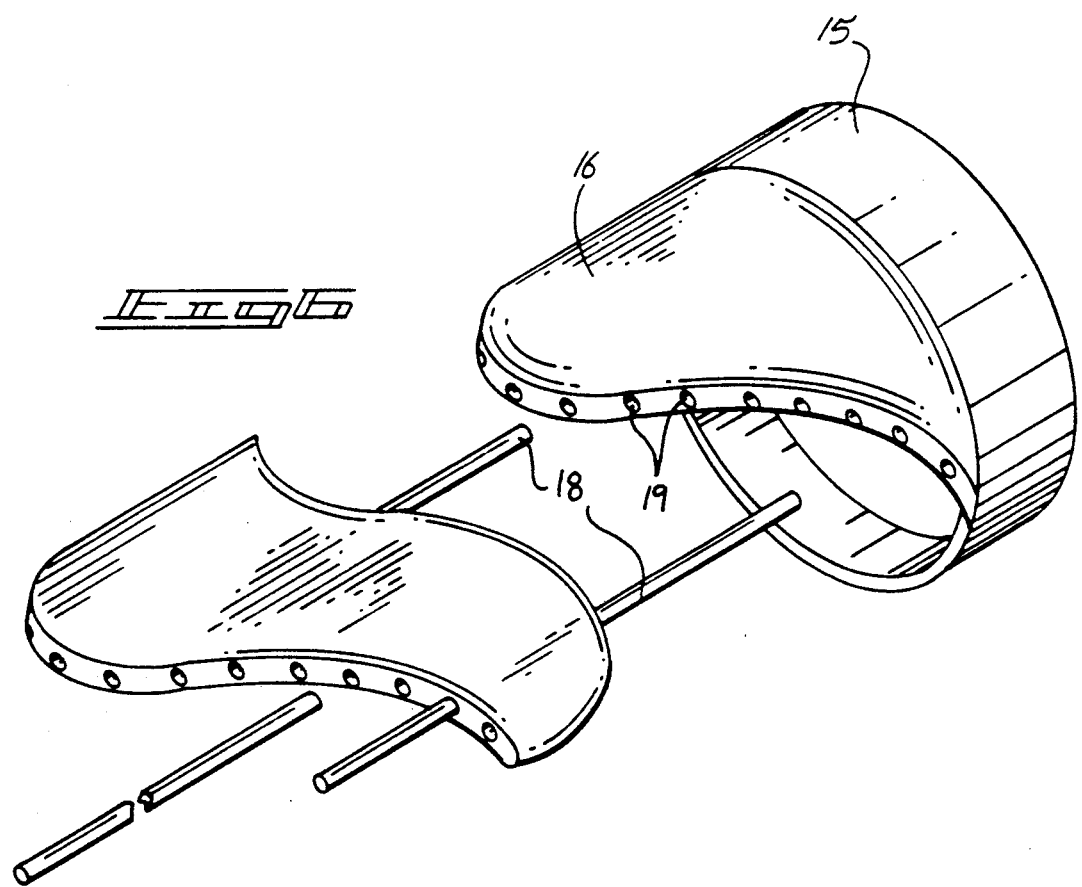
FIG. 6 is an exploded isometric illustration of the instant invention.

Further, the hood member 16 may be formed with a series defining a plurality of parallel rods 18 formed of deformable material that are coextensive of each hood member 16 arranged parallel relative to one another. Each of the rods 18 are positioned within an enclosed cylindrical cavity 19, as illustrated in FIGS. 5-7. In this manner, the hood member 16 may be manipulated manually to form a shading structure of a desired configuration dependent upon circumstances of a particular user.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A binocular shield for securement to a binocular assembly, wherein the binocular assembly includes a plurality of binocular legs, each leg mounting a binocular lens adjacent a forward terminal end of each binocular leg, wherein the binocular shield comprises,
    a plurality of shield members, each shield member including a cylindrical band, each cylindrical band formed of a resilient material for securement about each binocular leg adjacent a forward terminal end of each binocular leg, with each cylindrical band including a hook member fixedly and coextensively mounted to a side edge of each cylindrical band,
    each shield member includes a joinder strap, with the joinder strap joined to each cylindrical band to join the shield members in a unitary assembly,
    each hook member includes a convex exterior surface and is mounted to each cylindrical band to define an arc between one hundred forty and two hundred seventy degrees, and
    each hood member includes a plurality of parallel enclosed cylindrical cavities and cylindrical rods, wherein each cylindrical rod positioned within each cylindrical cavity is deformable to provide manual contouring of each hood member.

* * * * *